No. 695,234. Patented Mar. 11, 1902.
P. RICHEMOND.
VALVE.
(Application filed Aug. 19, 1901.)

(No Model.)

Witnesses:
Nicholas Louis Aropau
William Hawes Clarke.

Inventor
Pierre Richemond
By James L. Norris
Atty

UNITED STATES PATENT OFFICE.

PIERRE RICHEMOND, OF PANTIN, FRANCE, ASSIGNOR TO SOCIÉTÉ ANONYME DES ETABLISSEMENTS WEYHER ET RICHEMOND, OF PANTIN, SEINE, FRANCE.

VALVE.

SPECIFICATION forming part of Letters Patent No. 695,234, dated March 11, 1902.

Application filed August 19, 1901. Serial No. 72,568. (No model.)

*To all whom it may concern:*

Be it known that I, PIERRE RICHEMOND, engineer, a citizen of the Republic of France, residing at Pantin, department of Seine, France, (having post-office address 50 Route d'Aubervilliers, in the said city,) have invented certain new and useful Improvements in Valves, of which the following is a specification.

This invention relates to the kind of valves for controlling the passage of fluids for which I have made application for United States Letters Patent, dated June 21, 1901, Serial No. 65,486, which is intended to effect without friction the distribution of the motive fluids in steam, petroleum, or other fluid engines. A valve constructed according to that invention comprises a metallic ring having a U-shaped cross-section with two tapered surfaces, the one of which is intended to cover the steam-passages, the other being intended to contract the diameter of the said ring or valve, so as to avoid any friction during its displacements, the said ring or valve being made elastic by means of a longitudinal split, and in order that my invention may be fully understood I will describe the same with reference to the accompanying drawings, of which—

Figure 1:
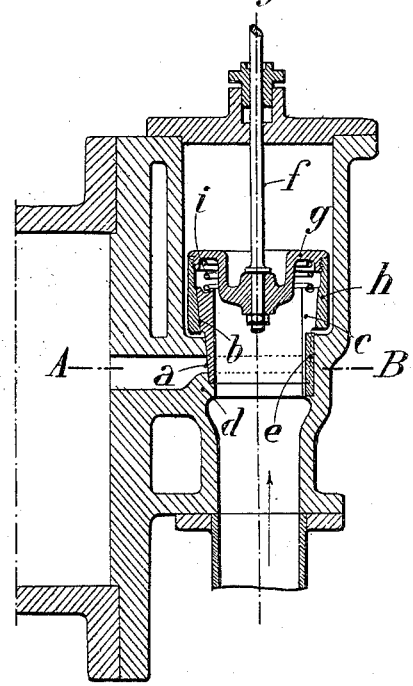
Figure 2:
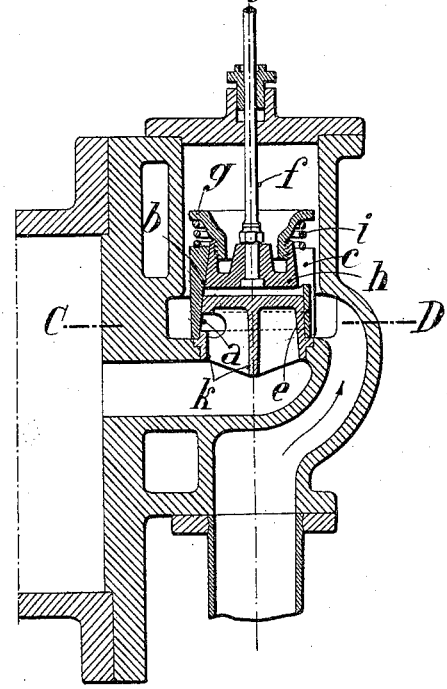
Figure 3:
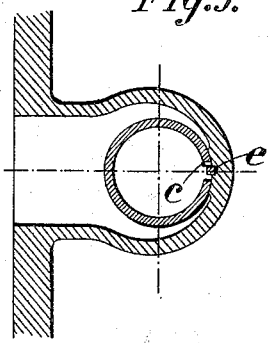
Figure 4:
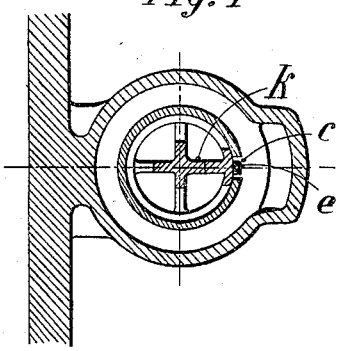

Figure 1 is a longitudinal section of one form of the valve. Fig. 2 is a longitudinal section of a modified form of the same. Figs. 3 and 4 are cross-sections through the lines A B and C D of Figs. 1 and 2, respectively.

According to the first form, Figs. 1 and 3, the valve comprises two conical parts $a$ $b$, arranged the one within the other, and a longitudinal split $c$, which insures the valve its elasticity. The conical part $a$ of the valve fits a conical seat $d$ in the valve box or chamber, which is provided with a key $e$, engaging the split of the valve for the purpose of preventing axial movement. This valve operates in the same manner as that described in my previous application—that is to say, that the piece $g$ $h$, attached to the cover of the valve and to the rod $f$, the longitudinal movement of which may be derived from the valve-gear or other suitable operating apparatus, contracts the diameter of the valve and disengages it from its seat.

According to another arrangement (illustrated in Figs. 2 and 4) instead of the coned split body part of the valve being coned externally it is coned internally, as shown at $a$ $b$. The larger part of the cone fits over a conical seat $k$ in the center of the valve box or chamber, having a part or passage therein for the passage of the fluid. In the smaller end of the conical split part $a$ is a conical plug $g$ $h$, provided with a flange between which and the end of the split body part of the valve is interposed a spring $i$, which normally maintains the conical plug $g$ $h$ in contact with the conical surface of the said split part. The said conical plug is connected to valve-gear or other suitable operating mechanism which when operated to open the valve tends to draw the conical plug through the smaller end of the conical split part of the valve and expands the said split part, thereby permitting of it being easily moved on its seat. In this arrangement axial movement of the valve is prevented by a key or feather $e$ on the valve-seat engaging in the opening or split in the conical body of the valve.

In both arrangements hereinbefore described when the valve-gear or operating mechanism allows the valve to close the spring interposed between the two component parts of the valve insures the contact of the two tapered portions.

These valves can be employed in steam-engines, oil and gas engines, and for controlling the passage of fluids generally.

Having now particularly described and ascertained the nature of my invention and in what manner the same may be performed, I declare that what I claim is—

1. A valve which may be used as induction or eduction valve for steam or other fluid engines, consisting of a metallic ring having two external tapered parts $a$ $b$, one of which $a$ fits in a tapered seat in the valve-box and is provided with a longitudinal split $c$ giving elasticity to the said valve, a key $e$ in the valve-box and engaging the longitudinal split, for the purpose of preventing angular displacements of the ring, and a conical plug $g$ $h$ engaging externally the conical part $b$ of the valve so as to contract the diameter of the latter when operated by the valve-gear, substantially as set forth.

2. A valve which may be used as induction or eduction valve for steam or other fluid engines consisting of a metallic ring having two tapered parts one of which fits a tapered seat in the valve-box and is provided with a longitudinal split $c$ giving elasticity to the said valve, a key, engaging in the said split for the purpose of preventing angular displacements of the valve, and a plug engaging the coned part $b$ of the valve when operated by the valve-gear, substantially as set forth.

In testimony whereof I have hereunto set my hand in presence of two subscribing witnesses.

PIERRE RICHEMOND.

Witnesses:
 EDWARD P. MACLEAN,
 EMILE KLOTZ.